United States Patent [19]

Delcoco et al.

[11] Patent Number: 5,127,067
[45] Date of Patent: Jun. 30, 1992

[54] LOCAL AREA NETWORK WITH STAR TOPOLOGY AND RING PROTOCOL

[75] Inventors: Robert J. Delcoco, Columbia; Brian W. Kroeger, Ellicott City; John J. Kurtz, Catonsville, all of Md.

[73] Assignee: Westinghouse Electric Corp., Pittsburgh, Pa.

[21] Appl. No.: 580,059

[22] Filed: Sep. 10, 1990

[51] Int. Cl.⁵ .............................................. G02B 6/28
[52] U.S. Cl. .................................. 385/24; 359/118; 359/120; 359/127; 359/173; 385/46
[58] Field of Search .................. 350/96.15, 96.16; 455/610, 612; 385/24, 46; 359/118, 120, 121, 127, 173, 178, 179, 188, 195

[56] References Cited

U.S. PATENT DOCUMENTS

| | | | |
|---|---|---|---|
| 4,708,424 | 11/1987 | Marhic | 350/96.16 |
| 4,781,427 | 11/1988 | Husbands et al. | 350/96.16 |
| 4,815,803 | 3/1989 | Faulkner et al. | 350/96.16 X |
| 4,834,483 | 5/1989 | Arthurs et al. | 350/96.16 |
| 4,946,244 | 8/1990 | Schembri | 350/96.16 |

Primary Examiner—John D. Lee
Attorney, Agent, or Firm—T. H. Martin

[57] ABSTRACT

In a local area network all communication nodes are connected only to a centrally located star network coupler, but data is transmitted from one communication node to the next active communication node in a sequence defined by a ring protocol. The star network coupler may be implemented by switches capable of connecting a receiver for one communication node to a transmitter for the next communication node or to a bypass line for the next communication node. However, preferably the star network coupler comprises a selective multiplexer for each of the nodes. Each selective multiplexer has inputs connected to all of the communication nodes to receive therefrom transmission data and a line status signal indicating communication activity with each node so that inactive nodes can be bypassed.

25 Claims, 6 Drawing Sheets

LOCAL AREA NETWORK WITH STAR TOPOLOGY AND RING PROTOCOL

BACKGROUND OF THE INVENTION

1. Field of the Invention

The present invention is directed to a local area network (LAN) and, more particularly to a LAN having a star topology, but using a ring protocol to connect each active node to two adjacent active nodes, one transmitting data to the node and the other receiving data from the node.

2. Description of the Related Art

There are three primary network topologies used in local area networks (LANs), a linear bus, a star and a ring. For purposes of speed and security, it is desirable to connect nodes in a LAN using optical fibers. Due to technical problems with optical taps, a linear bus topology is difficult to implement using optical fibers.

A star topology is somewhat easier to implement using optical fibers, but it also has drawbacks. In a star coupled network, each of the nodes are connected to a central point via optical fibers and during an assigned time period broadcasts data to all of the other nodes. In a passive optical star coupler, data is broadcast by splitting the optical signal. This results in practical limitations on the size of a passive star coupled network to about 16 nodes due to the reduction in optical power in the splitting process. An active star coupler which regenerates the optical signal within the star can be used for larger networks, but are significantly more expensive and require additional controls that are typically provided by a linear bus and protocol used in conjunction.

A ring topology, using protocols such as the SAE High Speed Ring Bus, ANSI FDDI or IEEE 802.5, is the most easily implemented topology when using optical fibers. Each node typically converts an optical signal into an electrical signal to determine whether data is addressed to that node while regenerating and repeating all signals to the downstream node. As a result, the drawbacks of linear and star topologies with respect to optical implementations are not present in a ring network. However, failure at a signal node can prevent communication. Counter-rotating rings which reverse the direction of data transmission in the ring are one technique for overcoming a single link failure. However, loss of power or failure of a station in the network may be overcome by bypassing the station.

There are two primary optical bypass devices presently in use, a passive optical bypass and an electro-mechanical switch. The passive bypass has a 10 dB insertion loss. Thus, two consecutive passive bypasses would result in 20 dB attenuation which approaches the limit of currently available detectors' ability to receive the optical signal. An electro-mechanical switch uses a solenoid actuator to change the alignment of the optical fiber. This type of bypass typically has a 3 dB insertion loss, switching speed of about 10 ms and is often temperature and vibration sensitive. Thus, no more than about 6 consecutive inactive stations can be present in a ring network with electro-mechanical bypass switches and the network would be more susceptible to environmental factors.

SUMMARY OF THE INVENTION

An object of the present invention is to provide an optical LAN with the bypass capabilities of a star topology and the high speed and large size capacity of a ring topology.

Another object of the present invention is to provide an optical LAN, operated using a ring topology, with a central switching point for increased security and ease of maintenance.

A further object of the present invention is to provide an optical star-coupled LAN capable of being expanded modularly.

Yet another object of the present invention is to provide an optical LAN with a ring topology capable of bypassing an unlimited number of nodes without any increase in distortion or loss of signal power.

The above objects are obtained by providing a star network coupler for switching data between optical transmission lines in a network, each of the optical transmission lines connecting the star network coupler to a communication node, the star network coupler comprising: a plurality of interface means, corresponding to the optical transmission lines, for interfacing with the optical transmission lines; and switching means for switching transmission data from each of the interface means to any of the interface means. Preferably, the interface means provides a line status signal indicating activity on the corresponding optical transmission line and the switching means routes the transmission data to bypass all consecutive transmission lines indicated as being inactive by the lines status signal. The switching means preferably comprises a selective multiplexer for receiving the line status signal corresponding to each transmission line and the transmission data. The multiplexer may be implemented using NOR gates connected so as to require the transmission data to pass through only two gates regardless of how many nodes are bypassed, provided the interface means converts the transmission data from an optical to an electrical signal upon receipt in the star network coupler and converts the electrical signal to an optical signal for transmission to the destination node.

These objects, together with other objects and advantages which will be subsequently apparent reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1A:
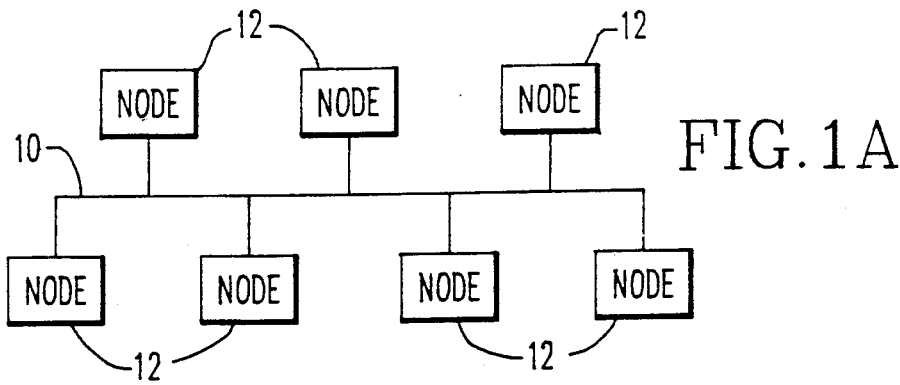
FIGS. 1A–1C are illustrations of linear bus, star and ring topologies.
Figure 1B:
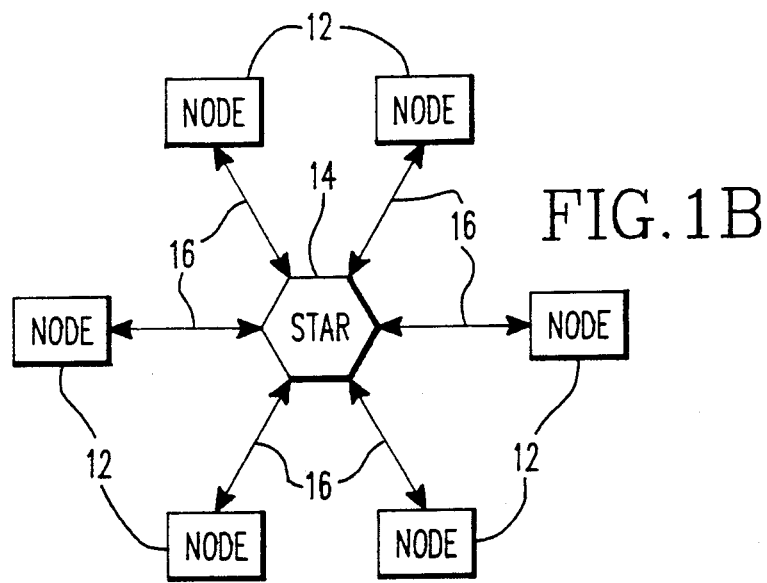
Figure 1C:
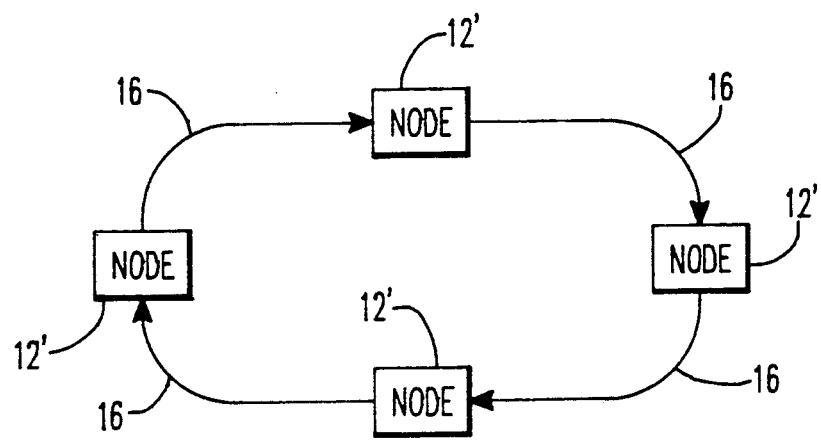

FIGS. 1A–1C illustrate local area networks (LANs) using a linear bus topology, a star bus topology and an active ring bus topology, respectively. As described above, use of the linear bus topology illustrated in FIG. 1 requires an optical tap in the linear bus 10 for each of the nodes 12. The star bus topology illustrated in FIG. 1B avoids the need for optical taps by concentrating all connections at one location, the star coupler 14, while using transmission lines 16 to transmit data from the nodes 12 to the star coupler 14. Both passive and active star couplers are used with optical transmission lines 16 and an electro-mechanical star coupler containing active switches is available for electrical transmission lines.

The ring bus topology illustrated in FIG. 1C takes the opposite approach of the star topology in FIG. 1B by distributing the switching among the nodes 12'. As described above, the nodes 12' in an optical ring LAN include some means for bypassing inactive stations connected to the nodes. All technologies presently used for bypassing have some limit on the number of consecutive stations that can be bypassed. In addition, the electro-mechanical bypass switches which can be used to bypass the largest number of consecutive stations are often susceptible to temperature changes and vibration.

The drawbacks of the three conventional topologies illustrated in FIGS. 1A–1C are overcome by combining the advantages of the star and ring topologies. This is accomplished according to the present invention by using a star topology and a ring protocol with a star network coupler which directly connects the transmitter of one node to a receiver in only one node. This contrasts with the conventional star network coupler which broadcasts the data from one node to all other nodes, thus requiring each node to wait its turn to transmit data. As a result, a LAN using a star network coupler according to the present invention has a latency, i.e., the delay between transmitting data from one node until receipt of a response from that node, which is similar to a ring topology since data transmission between nodes is performed as if the network had a ring topology.

Figure 2:
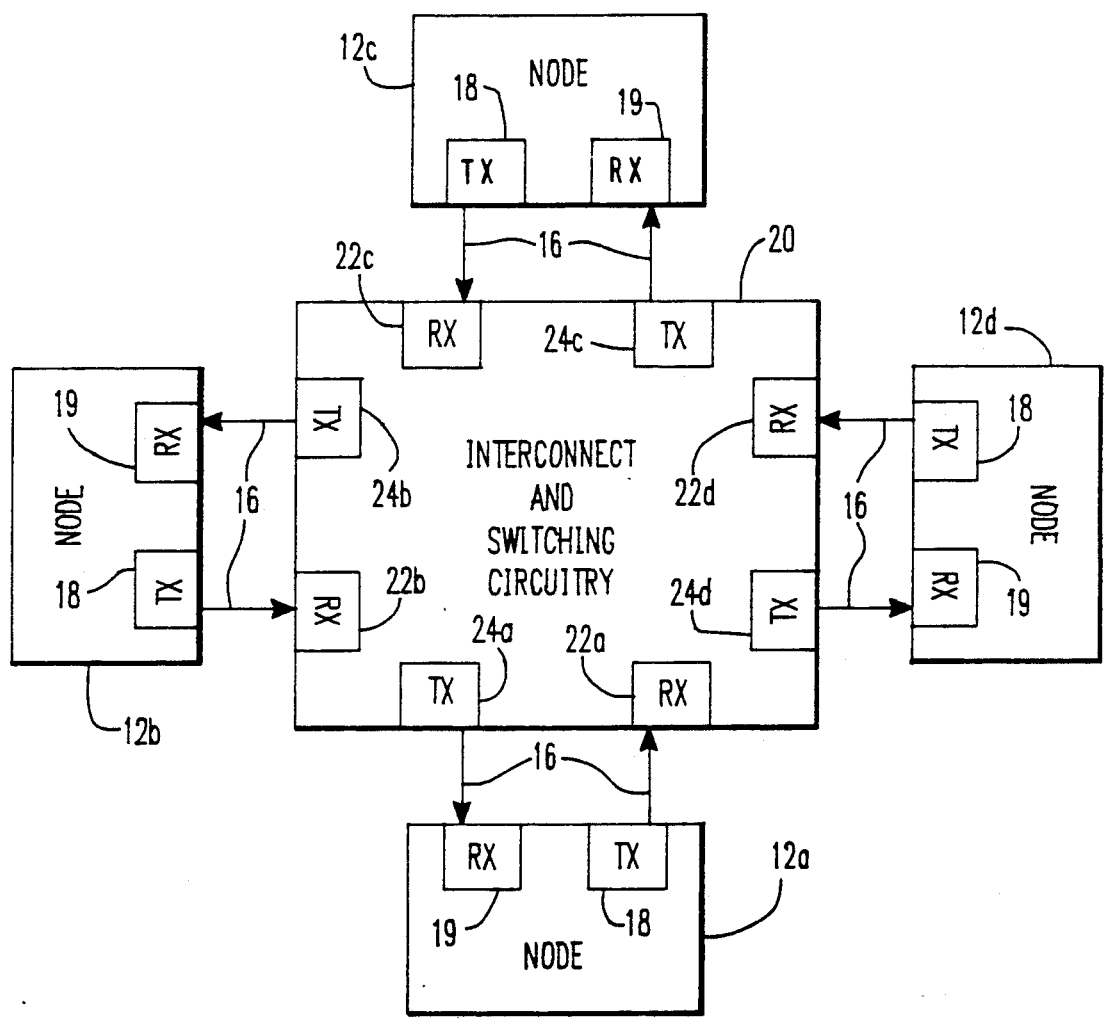
FIG. 2 is a block diagram of a four node star coupled LAN according to the present invention.

An example of a four node network using a star network coupler according to the present invention is illustrated in FIG. 2. Each node 12 includes a transmitter 18 and a receiver 19. A unidirectional transmission line 16 is illustrated as being connected to each transmitter 18 and receiver 19. With the addition of collision avoidance equipment a single bi-directional transmission line 16 could be used. A star network coupler 20 includes receivers 22 and transmitters 24, each connected via the transmission lines 16 to the transmitter 18 and receiver 19, respectively, in a corresponding node 12. The receiver 22 and transmitter 24 form an interface for the corresponding node 12. While the transmitters 24 may be constructed identically to the transmitters 18 in some embodiments, as described below, the receivers 22 must include means for supplying a line status signal indicating communication activity on the at least one corresponding transmission line 16 connected to the corresponding node 12. The line status signal is used to determine whether a node should be bypassed, as described below.

Assuming all nodes 12 are active in the network illustrated in FIG. 2 and assuming the existence of a ring protocol defining a clockwise sequence of the nodes 12 illustrated in FIG. 2, data received by receiver 22a from the transmitter 18 in node 12a will ordinarily be supplied by the interconnect and switching circuitry in star network coupler 20 to transmitter 24b. Transmitter 24b will transmit the data over transmission line 16 to the receiver 19 in node 12b. Similarly, data from node 12b will be transmitted to node 12c, data from node 12c will be transmitted to node 12d and data from node 12d will be transmitted to node 12a. Thus, although the physical, i.e., cabling, connections correspond to a star topology, the electrical connection operate under a ring protocol. If the star network coupler 20 was part of a conventional star coupled LAN, the data from node 12a received by receiver 22a would be broadcast to transmitters 24b–24d and then transmitted over transmission line 16 to the corresponding nodes 12b–12d.

Figure 3:
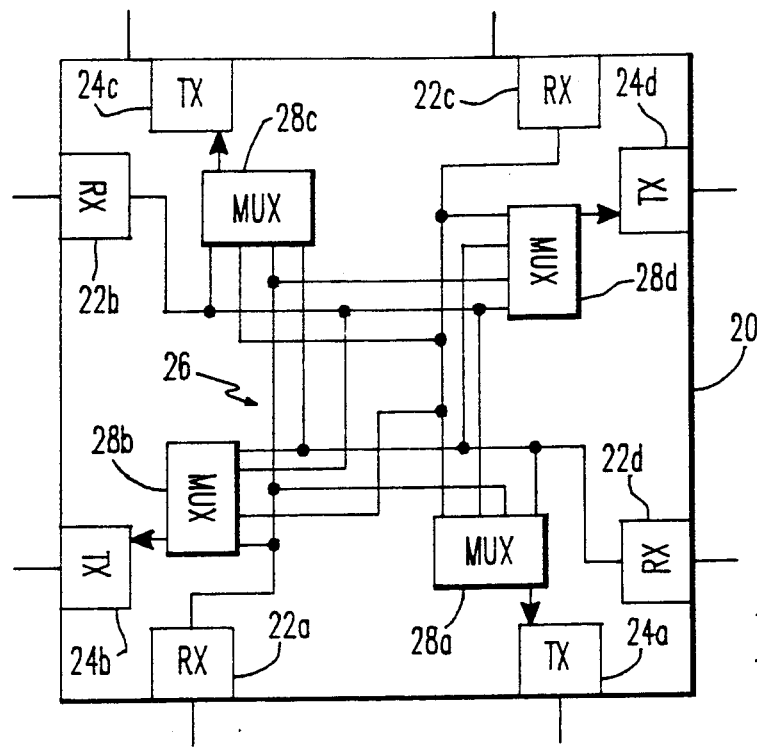
FIG. 3 is a block diagram of a star network coupler according to the present invention.

A first embodiment of the star network coupler 20 is illustrated in FIG. 3. In the first embodiment each receiver 22 includes opto/electrical conversion means for converting input optical signals from the transmission line 16 transmitting data from the corresponding node 12 into an electrical signal output as transmission data. Similarly, each transmitter 24 includes electro/optical conversion means for converting the transmission data into optical signals for output to the corresponding optical transmission line 16. The opto/electrical and electro/optical conversion means may be conventional devices for converting between optical and electrical signals, such as photodiodes and semiconductor lasers, respectively.

Each receiver 22 is connected via a network of electrical signal lines 26 to a group of selective multiplexers 28. Each selective multiplexer 28 supplies transmission data to one of the transmitters 24 in dependence upon the ring protocol and the line status signals received from the receivers 22.

Figure 4:
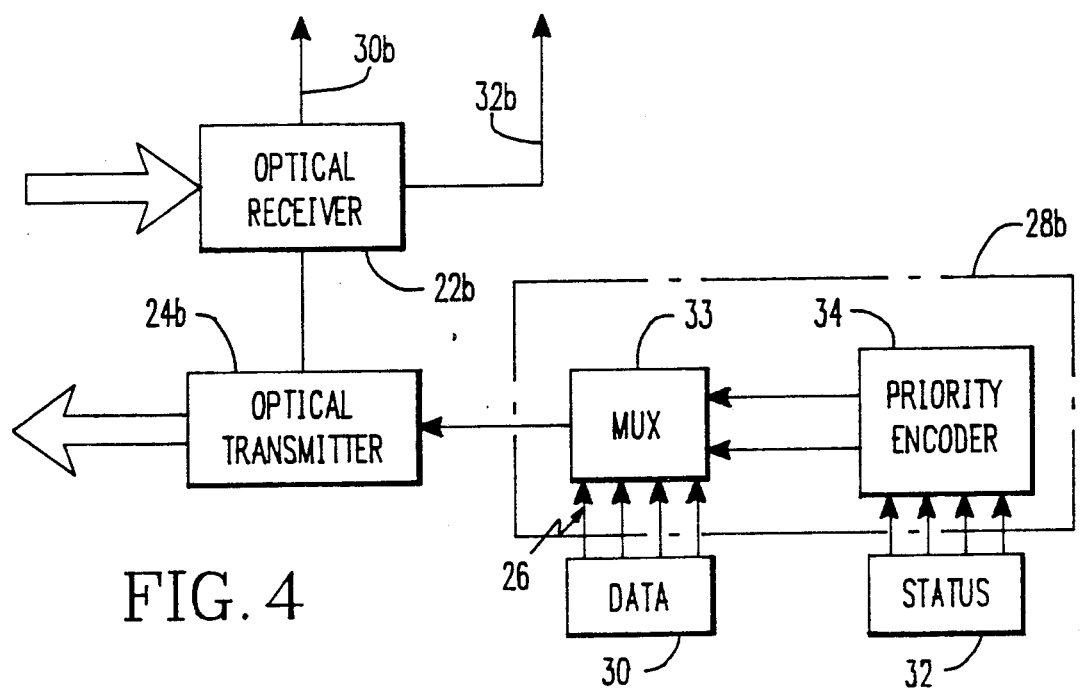
FIG. 4 is a block diagram of a first embodiment for a one-node portion of the star network coupler illustrated in FIG. 3.

A first embodiment of a selective multiplexer 28 is illustrated in FIG. 4, taking as an example selective multiplexer 28b. Also illustrated in FIG. 4 are the optical receiver 22b and transmitter 24b corresponding to selective multiplexer 28b. The selective multiplexer 28b receives data 30 and line status signals 32 from each of the receivers 22. The data 30 is supplied, e.g., serially, to a conventional multiplexer 33. The line status signals 32 are supplied to a priority encoder 34 which defines a sequence of interfaces, each corresponding to one of the nodes 12, which precede the interface containing the transmitter 24b connected to the output of multiplexer 33.

In the example illustrated in FIG. 4, the sequence defined in priority encoder 34 would select in order data from receiver 22a, data from receiver 22d, data from receiver 22c and then data from receiver 22b. Only if the line status signal 32 corresponding to receiver 22a indicates that the node 12a is inactive, i.e., powered down, failed, etc., would data from any other node be supplied to node 12b via transmitter 24b. In that case, the data from node 12d would be supplied to node 12b, unless the line status signal from receiver 22d indicated an inactive communication activity status on transmission line 16 supplying data from node 12d. The sequence defined by the ring protocol will continue to be followed to select data from the interface most closely preceding the interface (22b, 24b) corresponding to the selective multiplexer 28b and having an active communication status indicated by the line status signal, until a loopback of data from node 12b is performed if all other nodes in the network are inactive. The priority encoder 34 may be implemented by any conventional means, such as programmable array logic, gate array, etc.

Figure 5:
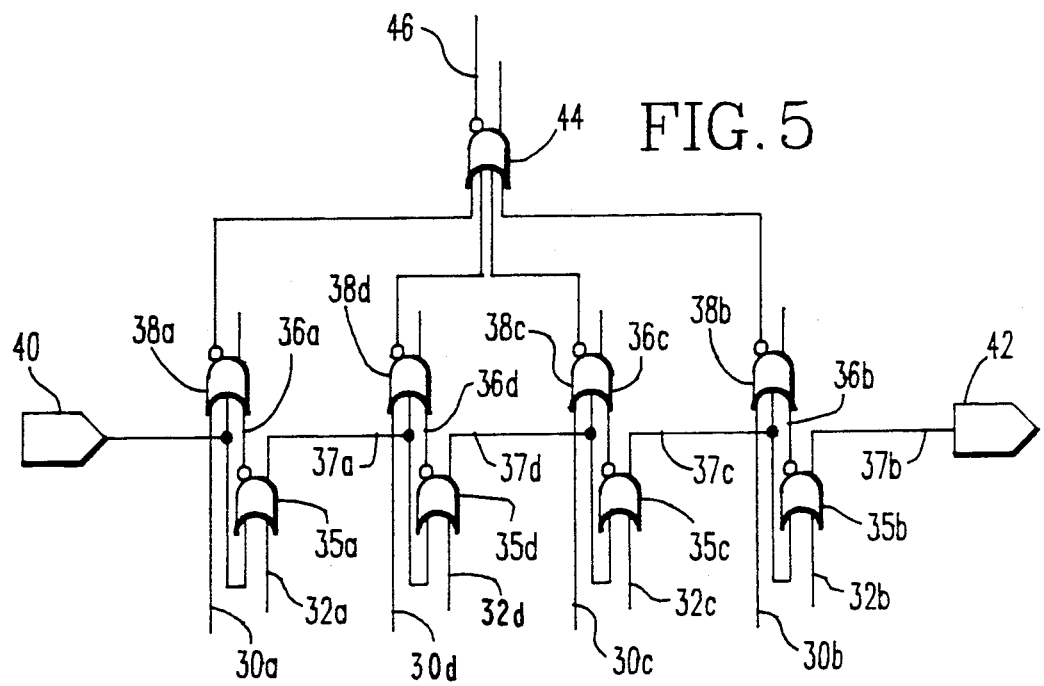
FIG. 5 is a second embodiment of a multiplexer unit used in a one-node portion of the star network coupler illustrated in FIG. 3.

A second embodiment of a selective multiplexer is illustrated in FIG. 5. This embodiment is designed to minimize delays and distortion caused by logic gates by requiring the transmission data to pass through only two gates in the selective multiplexer 28 no matter how many nodes are bypassed. Each gate in a first row of NOR logic gates 35 receive one of the line status signals on status lines 32a-32d. The first row of NOR gates 35a-35d produce selection signals on lines 36a-36d and inverted selection signals on lines 37a-37d. A second row of NOR gates 38a-38d receive the selection signals on lines 36a-36d and data signals on lines 30a-30d. The inverted selection signals on lines 37a-37d are supplied to the inputs of the NOR gates in the first 35 and second 38 rows which receive the data and line status signal corresponding to the next highest priority node. Thus, the inverted selection signal on line 37a corresponding to node 12a is supplied as a input to NOR gates 35d and 38d.

A cascade input 40 is provided to the initial first and second row NOR gates 35a, 38a. Similarly, the final inverted selection signal on line 37b is supplied as a cascade output 42. In a star network coupler for a network having more than 4 nodes, the multiplexer illustrated in FIG. 5 can be used in building block fashion with the cascade input 40 of one multiplexer connected to the cascade output 42 of another multiplexer. Two such multiplexers permit up to eight nodes in a network, three such multiplexers permit up to 12 nodes, etc. In the four node network illustrated in FIG. 2, the cascade input 40 is set to zero so that when the line status signal on line 32a indicates that the transmission line to node 12a is active (logic "1"), the selection signal on line 36a will be logic "0" and the NOR gate 38a in the second row will act as an inverter for data on line 30a. On the other hand, if the line status signal on line 32a indicates that the transmission line 16 for the corresponding node 12a is inactive (logic "0"), the selection signals on line 36a will be logic "1", forcing the output of NOR gate 38a to be fixed at logic "0".

Similarly, the inverted selection signals on lines 37a-37d prevent or enable the following NOR gates to operate. When the selection signal on line 36a has logic "0", the inverted selection signal on line 37a will have logic "1" forcing the inverted selection signals on lines 37b-37d to logic "1" and the output of NOR gates 38b-38d to logic "0". On the other hand, if the line status signal on line 32a is logic "0" indicating that the corresponding node 12a is inactive, the inverted selection signal 37a will have logic "0" enabling the line status signal on line 32d to control the selection signal on line 36d, thus controlling the selection of data by NOR gate 38d. The output of the second row of NOR gates 38a-38d is supplied to an output NOR logic gate 44 having an output 46 connected to the transmitter, in this case transmitter 24b, corresponding to the selective multiplexer 28b.

Figure 6:
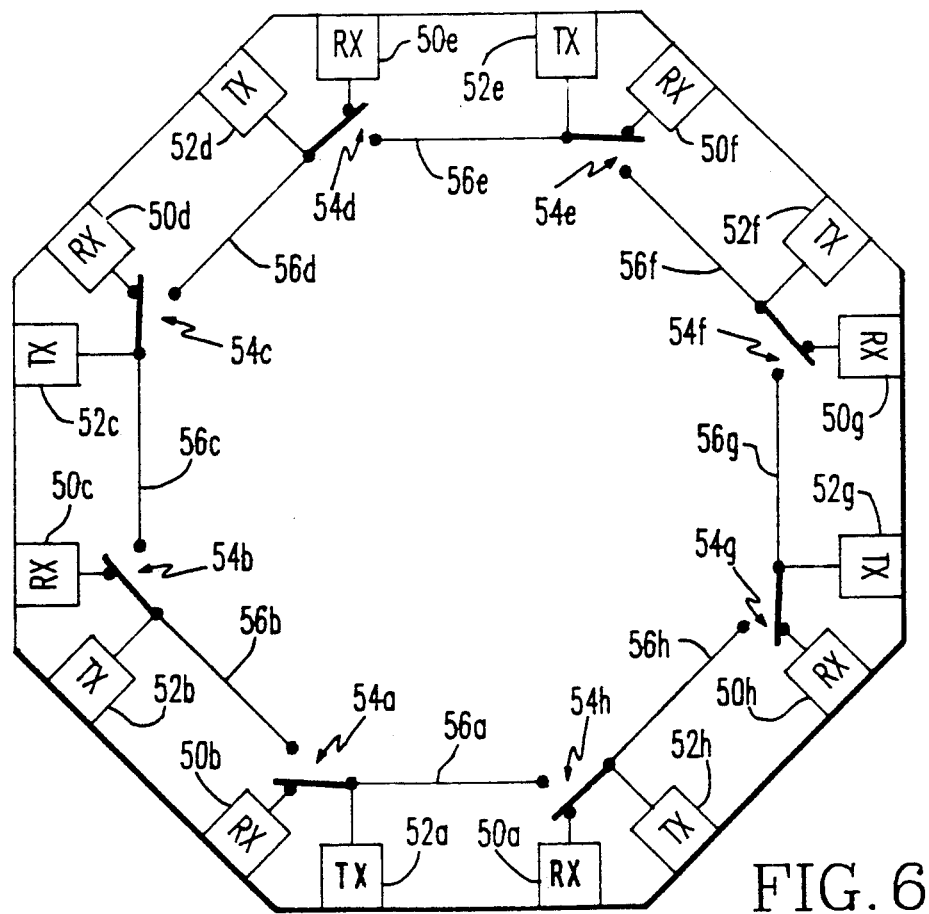
FIG. 6 is a block diagram of an eight-node star network coupler according to a second embodiment of the present invention.

A second embodiment of a star network coupler according to the present invention is illustrated in FIG. 6. The star network coupler illustrated in FIG. 6 is capable of connecting up to 8 nodes. As in the star network coupler illustrated in FIG. 2, a receiver 50 and transmitter 52 is provided to interface with each of the nodes 12. The receivers and transmitters are represented by different reference numerals in FIG. 6, because they do not necessarily include means for converting between electrical and optical signals for reasons discussed below. However, as in the first embodiment the receivers 50 generate a line status signal indicating communication activity status on the line transmission line supplying data to the receiver. The line status signals control the operation of series-connected switches 54a-54h. The switches 54a-54h are connected by internal transmission lines 56a-54h which provide bypass means for the corresponding interfaces 50, 52.

The connections of each of the switches 54 are the same. Taking switch 54a as an example, a first terminal is connected to the transmitter 52a and bypass means 56a of the corresponding interface, in this case the interface for node 12a. A second terminal is connected to the receiver 50b in an adjacent interface and a third terminal is connected to the bypass means 56b corresponding to the adjacent interface. The switch 54a is controlled by the line status signal from receiver 50b indicating whether the adjacent interface 50b, 52b corresponds to an active optical transmission line. If the receiver 50b is receiving data, the switch 54a will be in the position illustrated. Thus, FIG. 6 illustrates the position of switches 54a-54h when all nodes 12 are active. If the transmission line connected to receiver 50b is inactive, switch 54a will be moved to the position connecting the transmitter 52a and bypass line 56a to bypass line 56b. Thus, if receiver 50c is receiving data, transmitter 52a will output the data received by receiver 50c to node 12a. It should be noted that the ring protocol for the star network coupler illustrated in FIG. 6 defines a counter clockwise sequence of nodes, as apparent from the preceding discussion.

If the receivers 50 and transmitters 52 include opto/electronic and electro/optical conversion, as in the embodiment illustrated in FIG. 2, the switches 54 may be constructed from transistors or electro-mechanical relays. Alternatively, the receivers 50 in the interfaces may output optical data if the bypass line 56 and switches 54 provide optical data transmission. In the latter case, the switches or relays 54 may be an electromechanical switch controlled by the line status signal similar to the electro-mechanical switch used in some conventional ring bypass links. The switches or relays 54 may also be a block of lithium niobate providing two optical wave guides and having a doped region receiving the line status signal to control selection of the two optical wave guides for use by the optical data signal. Also, a polymer may be used having an index of refraction varying in dependence upon the line status signal from the adjacent interface to switch the optical data signal between the second and third terminals.

Figure 7A:
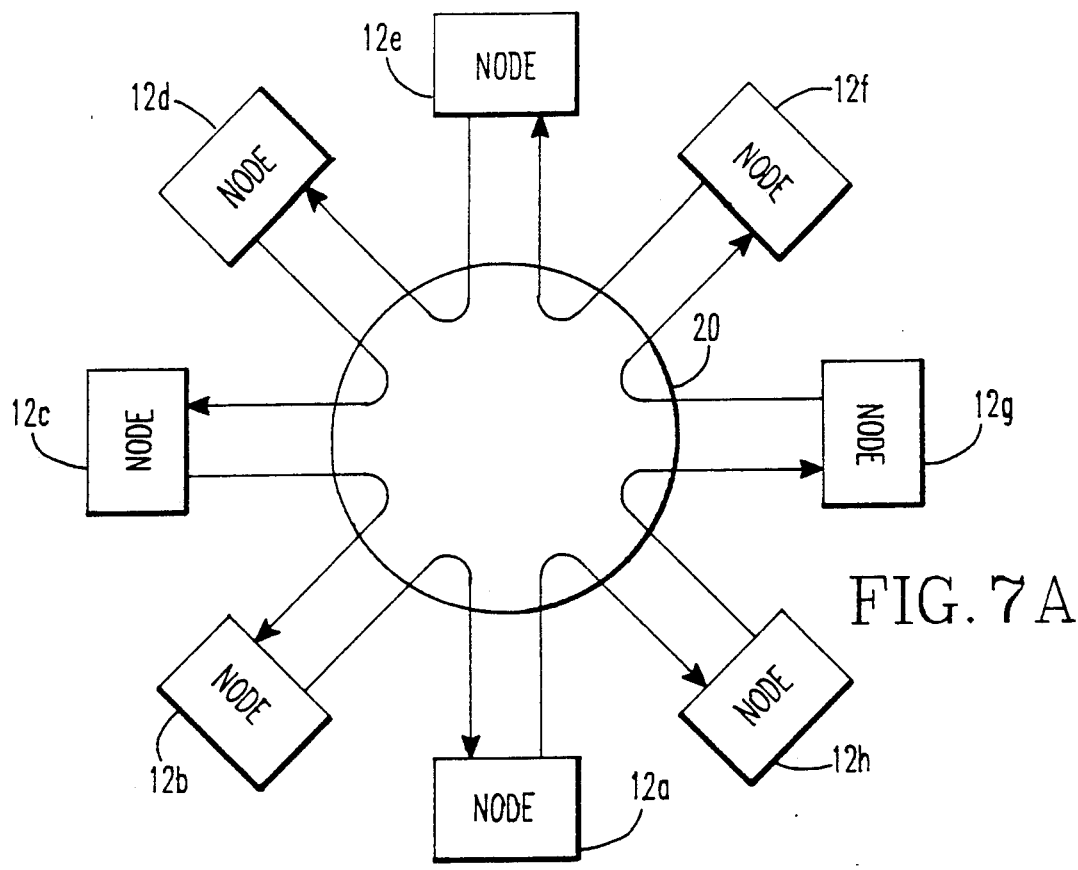
FIG. 7A–7C are block diagrams of LANs using a star network coupler according to the present invention.
Figure 7B:
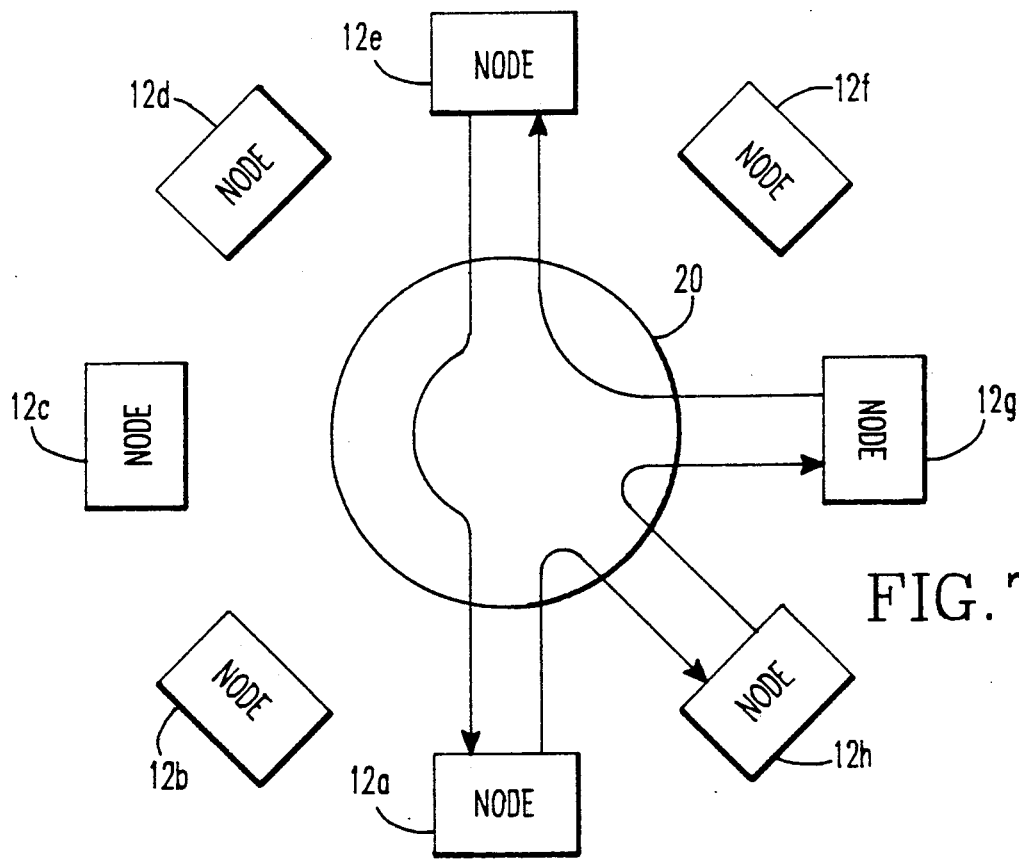
Figure 7C:
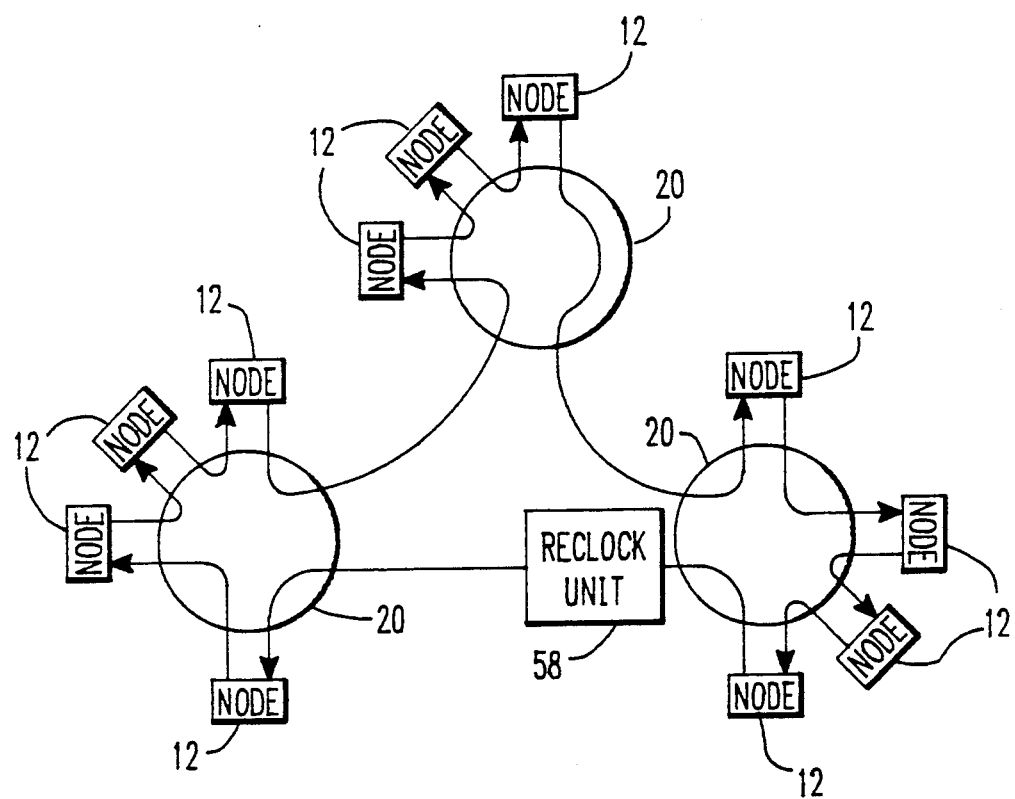

Using any of the above-described embodiments, LANs may be constructed having electrical connections providing data flow as illustrated in FIGS. 7A-7C. The example illustrated in FIG. 7A corresponds to a star network coupler having switch settings like that illustrated in FIG. 6. The network illustrated in FIG. 7B indicates the connections which result when nodes 12b, 12c, 12d and 12f are inactive for whatever reason. In the star network coupler illustrated in FIG. 6, switches 54a, 54b, 54c and 54e would change position from that illustrated in FIG. 6 to connect to the bypass lines 56b, 56c, 56d and 56f, respectively.

Since there is minimal loss in optical signal strength in passing through a star network coupler according to the present invention, it is possible to connect two star couplers together with transmission lines. This can result in a network like that illustrated in FIG. 7C or one having even more nodes with the same number of star couplers 20 since no more than five interfaces are in use in any of the star couplers 20 illustrated in FIG. 7C. If necessary, the transmission lines connecting star couplers 20 in a complex network like that illustrated in FIG. 7C may include a reclock unit 58 to maintain synchronism of the signals. Similarly, a reclock unit can be used inside a star network coupler having a large number of interfaces, particularly when the star network coupler is constructed according to the second embodiment using series-connected switches.

The many features and advantages of the present invention are apparent from the detailed specification, and thus it is intended by the appended claims to cover all such features and advantages of the system which fall within the true spirit and scope of the invention. Further, since numerous modifications and changes will readily occur to the those skilled in the art from the disclosure of this invention, it is not desired to limit the invention to the exact construction and operation illustrated and described. For example, the selective multiplexer embodiment illustrated in FIG. 5 can be used in an all electrical LAN to provide the centralized switching of a star topology in a LAN having a ring protocol. Accordingly, suitable modifications and equivalents may be resorted to, all falling within the scope and spirit of the invention.

What is claimed is:

1. A star network coupler for switching data between optical transmission lines in a network, each of the optical transmission lines connecting said star network coupler to a communication node, said star network coupler comprising:
   a plurality of interface means, corresponding to the optical transmission lines, for interfacing with the optical transmission lines and each of said interface means has at least one corresponding optical transmission line;
   switching means for switching transmission data from each of said interface means to any one of said interface means, said switching being dependent upon a ring protocol, said interface means being ordered according to the ring protocol to define a sequence of said interface means, the data bypassing any of said interface means corresponding to an inactive optical transmission line;
   said at least one corresponding optical transmission line includes opto/electrical conversion means for converting input optical signals from the at least one corresponding optical transmission line into electrical signals output as the transmission data from said interface means;
   electro/optical conversion means for converting the transmission data, switched thereto by said switching means, into output optical signals for output to the at least one corresponding optical transmission line; and
   status means for supplying a line status signal indicating communication activity on the at least one corresponding optical transmission line;
   wherein said switching means includes selective multiplexing means including a plurality of multiplexers each for receiving the line status signal from said status means, respectively, through one of a like plurality of priority encoders in each of said interface means and the transmission data from said interface means and for switching the transmission data to said interface means in dependence upon the ring protocol and the line status signal from said status means in each of said interface means.

2. A star network coupler as recited in claim 1,
   wherein said interface means are ordered according to the ring protocol to define a sequence of said interface means, and
   wherein said switching means comprises:
   a plurality of bypass means for providing a bypass route across each of said interface means;
   a plurality of switches, each having a first terminal operatively connected to corresponding interface and bypass means, a second terminal operatively connected to an adjacent one of said interface means and a third terminal operatively connected to said bypass means corresponding to the adjacent one of said interface means, each of said switches selecting between the second and third terminals thereof in dependence upon whether the adjacent one of said interface means corresponds to an active optical transmission line.

3. A star network coupler as recited in claim 2, further comprising reclocking means for reclocking the transmission data in said star network coupler.

4. A star network coupler as recited in claim 2,
   wherein each of said interface means has at least one corresponding optical transmission line and comprises:
   opto/electrical conversion means for converting input optical signals from the at least one corresponding optical transmission line into an electrical signal output as the transmission data from said interface means;
   electro/optical conversion means for converting the transmission data, switched thereto by said switching means, into output optical signals for output to the at least one corresponding optical transmission line; and
   status means for supplying a line status signal indicating communication activity on the at least one corresponding optical transmission line, and
   wherein each of said switches comprises transistors.

5. A star network coupler as recited in claim 2,
   wherein each of said interface means has at least one corresponding optical transmission line and comprises:
   opto/electrical conversion means for converting input optical signals from the at least one corresponding optical transmission line into an electrical signal output as the transmission data from said interface means;
   electro/optical conversion means for converting the transmission data, switched thereto by said switching means, into output optical signals for output to the at least one corresponding optical transmission line; and
   status means for supplying a line status signal indicating communication activity on the at least one corresponding optical transmission line, and
   wherein each of said switches comprises an electromechanical relay.

6. A star network coupler as recited in claim 2,
   wherein each of said interface means outputs an optical data signal received from a corresponding optical transmission line and a line status signal indicating communication status of the corresponding optical transmission line, and wherein each of said switches routes the optical data signal to one of the second and third terminals thereof in dependence upon the line status signal.

7. A star network coupler as recited in claim 6, wherein the line status signal is an electrical signal and each of said switches is an electro-mechanical switch controlled by the line status signal to move a first end of a light path, coupled at a second end to the first terminal, between the second and third terminals.

8. A star network coupler as recited in claim 6, wherein each of said switches comprises a lithium niobate substrate providing two optical wave guides and a doped region receiving the line status signal to control selection of the two optical wave guides for use by the optical data signal.

9. A star network coupler as recited in claim 6, wherein each of said switches comprises a polymer having an index of refraction varying in dependence upon the line status signal from the adjacent one of said interface means to switch the optical data signal to one of the second and third terminals thereof.

10. A star network coupler as recited in claim 1, wherein said interface means are ordered according to the ring protocol to define a sequence of said interface means and each of said interface means outputs an optical data signal received from a corresponding optical transmission line and a line status signal indicating communication status of the corresponding optical transmission line, and wherein said switching means routes the optical data signal received by each of said interface means in an active state to a most closely following interface means in dependence upon the line status signal from the most closely following interface means and each inactive interface means bypassed by the optical data signal.

11. A star network coupler as recited in claim 1, wherein said selective multiplexing means including said plurality of multiplexers, each having an output operatively connected to said electro/optical conversion means in a corresponding interface means and inputs operatively connected to said opto/electrical conversion means in said interface means to receive the transmission data; and said plurality of priority encoders, each having inputs operatively connected to said status means in said interface means and an output operatively connected to a corresponding multiplexer to supply a selection signal controlling selection of the transmission data from said opto/electrical conversion means in said interface means most closely preceding the corresponding interface means and having an active communication status indicated by the line status signal.

12. A star network coupler as recited in claim 1, wherein said selective multiplexing means comprises groups of logic gates, each group connected to a corresponding electro/optical conversion means to supply the transmission data and including:

first logic gates, each producing a selection signal and operatively connected to receive the line status signal from said status means in a corresponding interface means and to receive an inverted selection signal from an immediately preceding first logic gate according to the sequence of said interface means, except for an initial first logic gate operatively connected to receive a cascade input;

second logic gates, each having an output and having inputs operatively connected to receive the selection signal from a corresponding first logic gate, the transmission data from said opto/electrical conversion means in the corresponding interface means and one of the inverted selection signal and the cascade input received by the corresponding first logic gate; and an output logic gate having inputs operatively connected to the output of each of said second logic gates and an output operatively connected to the corresponding electro/optical conversion means.

13. A star network coupler for switching data between optical transmission lines in a network, each of the optical transmission lines connecting said star network coupler to a communication node, said star network coupler comprising:

a plurality of interface means, corresponding to the optical transmission lines, for interfacing with the optical transmission lines, and each of said interface means has at least one corresponding optical transmission line;

switching means for switching transmission data from each of said interface means to any one of said interface means, said switching being dependent upon a ring protocol, said interface means being ordered according to the ring protocol to define a sequence of said interface means, the data bypassing any of said interface means corresponding to an inactive optical transmission line;

said at least one corresponding optical transmission line includes opto/electrical conversion means for converting input optical signals from the at least one corresponding optical transmission line into electrical signals output as the transmission data from said interface means;

electro/optical conversion means for converting the transmission data, switched thereto by said switching means, into output optical signals for output to the at least one corresponding optical transmission line; and status means for supplying a line status signal indicating communication activity on the at least one corresponding optical transmission line;

wherein said switching means includes selective multiplexing means for receiving the line status signal from said status means in each of said interface means and the transmission data from said interface means and for switching the transmission data to said interface means in dependence upon the ring protocol and the line status signal from said status means in each of said interface means;

said selective multiplexing means including a plurality of multiplexers, each having an output operatively connected to said electro/optical conversion means in a corresponding interface means and inputs operatively connected to said opto/electrical conversion means in said interface means to receive the transmission data; and a like plurality of priority encoders, each having inputs operatively connected to said status means in said interface means and an output operatively connected to a corresponding multiplexer to supply a selection signal controlling selection of the transmission data from said opto/electrical conversion means in said interface means most closely preceding the corresponding interface means and having an active communication status indicated by the line status signal.

14. A star network coupler for switching data between optical transmission lines in a network, each of the optical transmission lines connecting said star network coupler to a communication node, said star network coupler comprising:
   a plurality of interface means, corresponding to the optical transmission lines, for interfacing with the optical transmission lines, and each of said interface means has at least one corresponding optical transmission line;
   switching means for switching transmission data from each of said interface means to any one of said interface means, said switching being dependent upon a ring protocol, said interface means being ordered according to the ring protocol to define a sequence of said interface means, the data bypassing any of said interface means corresponding to an inactive optical transmission line;
   said at least one corresponding optical transmission line includes opto/electrical conversion means for converting input optical signals from the at least one corresponding optical transmission line into electrical signals output as the transmission data from said interface means;
   electro/optical conversion means for converting the transmission data, switched thereto by said switching means, into output optical signals for output to the at least one corresponding optical transmission line; and
   status means for supplying a line status signal indicating communication activity on the at least one corresponding optical transmission line;
   wherein said switching means includes selective multiplexing means for receiving the line status signal from said status means in each of said interface means and the transmission data from said interface means and for switching the transmission data to said interface means in dependence upon the ring protocol and the line status signal from said status means in each of said interface means;
   said selective multiplexing means comprises groups of logic gates, each group connected to a corresponding electro/optical conversion means to supply the transmission data and comprising:
   first logic gates, each producing a selection signal and operatively connected to receive the line status signal from said status means in a corresponding interface means and to receive an inverted selection signal from an immediately preceding first logic gate according to the sequence of said interface means, except for an initial first logic gate operatively connected to receive a cascade input;
   second logic gates, each having an output and having inputs operatively connected to receive the selection signal from a corresponding first logic gate, the transmission data from said opto/electrical conversion means in the corresponding interface means and one of the inverted selection signal and the cascade input received by the corresponding first logic gate; and
   an output logic gate having inputs operatively connected to the output of each of said second logic gates and an output operatively connected to the corresponding electro/optical conversion means.

15. A star network coupler as recited in claim 14, wherein each of said first, second and output logic gates is a NOR gate.

16. A centralized switching system for a star coupled communication network having transmission lines connecting said switching system to communication nodes, comprising:
   communication status means for outputting line status signals, each indicating communication activity on a corresponding one of the transmission lines transmitting data to said switching system; and
   selective multiplexing means including a plurality of multiplexers each for receiving the line status signals from said communication status means and data signals from the transmission lines, respectively, through one of a like plurality of priority encoders and for switching the data signals received from each of the transmission lines transmitting data to a following transmission line according to a sequence defined by a ring protocol and corresponding to one of the lien status signals indicating active communication.

17. A switching system as recited in claim 16, wherein said selective multiplexing means with said plurality of multiplexers, each having an output operatively connected to the corresponding transmission line and inputs operatively connected to all of the transmission lines capable of sending data to the switching system; and
   said plurality of priority encoders, each having inputs operatively connected to said communication status means and an output operatively connected to a corresponding multiplexer to supply a selection signal controlling selection of the transmission data from the transmission line having a corresponding line status signal indicating active communication and most closely preceding the corresponding transmission line according to the sequence defined by the ring protocol.

18. A switching system as recited in claim 16, wherein said selective multiplexing means includes groups of logic gates, each group connected to a corresponding transmission line to supply the transmission data thereto and including:
   first logic gates, each producing a selection signal and operatively connected to receive one of the line status signals from said communication status means and to receive an inverted selection signal from an immediately preceding first logic gate according to the sequence of transmission lines defined by the ring protocol, except for an initial first logic gate, the initial first logic gate receiving a cascade input;
   second logic gates, each having an output and input operatively connected to receive the selection signal from a corresponding first logic gate, the transmission data from one of the transmission lines and one of the inverted selection signal and the cascade input received by the corresponding first logic gate; and
   an output logic gate having inputs operatively connected to the output of said second logic gates and an output operatively connected to the corresponding transmission line.

19. A switching system for a star coupled communication network having transmission lines connecting said switching system to communication nodes, comprising:

communication status means for outputting line status signals, each indicating communication activity on a corresponding one of the transmission lines transmitting data to said switching system;

selective multiplexing means for receiving the line status signals from said communication status means and data signals from the transmission line sand for switching the data signals received from each of the transmission lines transmitting data to a following transmission line according to a sequence defined by a ring protocol and corresponding to one of the line status signals indicating active communication;

said selective multiplexing means includes a plurality of multiplexers, each having an output operatively connected to the corresponding transmission line and inputs operatively connected to all of the transmission lines capable of sending data to the switching system; and a plurality of priority encoders, each having inputs operatively connected to said communication status means and an output operatively connected to a corresponding multiplexer to supply a selection signal controlling selection of the transmission data from the transmission line having a corresponding line status signal indicating active communication and most closely preceding the corresponding transmission line according to the sequence defined by the ring protocol.

20. A switch system for a star coupled communication network having transmission lines connecting said switching system to communication nodes, comprising:

communication status means for outputting line status signals, each indicating communication activity on a corresponding one of the transmission lines transmitting data to said switching system;

selective multiplexing means for receiving the line status signals from said communication status means and data signals from the transmission line sand for switching the data signals received from each of the transmission lines transmitting data to a following transmission line according to a sequence defined by a ring protocol and corresponding to one of the line status signals indicating active communication;

said selective multiplexing means includes groups of logic gates, each group connected to a corresponding transmission line to supply the transmission data thereto and including:

first logic gates, each producing a selection signal and operatively connected to receive one of the line status signals from said communication status means and to receive an inverted selection signal from an immediately preceding first logic gate according to the sequence of transmission lines defined by the ring protocol, except for an initial first logic gate, the initial first logic gate receiving a cascade input;

second logic gates, each having an output and input operatively connected to receive the selection signal from a corresponding first logic gate, the transmission data from one of the transmission lines and one of the inverted selection signal and the cascade input received by the corresponding first logic gate; and an output logic gate having inputs operatively connected to the output of said second logic gates and an output operatively connected to the corresponding transmission line.

21. A data communication network transmitting data between communication nodes, comprising:

transmission lines for transmitting data, each transmission line having first and second ends, the first end operatively connected to one of the communication nodes; and star network couplers operatively connected to the second ends of said transmission lines, each of said star network couplers including:

communication status means including a plurality of multiplexers each for outputting line status signals, each indicating communication activity on a corresponding transmission line; and selective multiplexing means for receiving the line status signal from said communication status means and data signals from the transmission lines, respectively, through one of a like plurality of priority encoders and for switching the transmission data received from each of the transmission lines transmitting data to a following transmission line according to a sequence defined by the ring protocol and corresponding to one of the line status signals indicating active communication, each of said star network couplers also operatively connected to at least one other star network coupler and transmitting data internally according to a ring protocol from one active transmission line to only one other active transmission line.

22. A data communication network as recited in claim 21, wherein said transmission lines comprise optical fibers.

23. A method of centralizing the switching of data between transmission lines connected to communication nodes which form a ring topology, said method comprising:

(a) automatically detecting communication activity in each of a plurality of transmission lines;

(b) connecting the transmission lines by logical cognitive selection of said activity such that said communication nodes form a specific ring topology, said topology excluding a selected number of failed communication nodes and transmission lines; and (c) transmitting data received from the selected transmission lines to a single transmission line selected for each of the transmission lines as having an active communication activity level detected in step (a) and following most closely thereafter according to the sequence defined in step (b).

24. The method of claim 23, wherein the step of connecting the transmission lines by logical selection includes connecting the transmission lines to accommodate various ring topology configurations selected from the group of single rings, braided rings, and dual counterrotating rings.

25. The method of claim 23, including re-clocking or regenerating received optical signals appropriate for the number of communication nodes by-passed.

* * * * *